US008717989B2

(12) United States Patent
Horiuchi et al.

(10) Patent No.: US 8,717,989 B2
(45) Date of Patent: May 6, 2014

(54) CCE+ NUMBER ALLOCATION METHOD AND BASE STATION DEVICE

(75) Inventors: Ayako Horiuchi, Kanagawa (JP); Seigo Nakao, Kanagawa (JP); Daichi Imamura, Kanagawa (JP); Akihiko Nishio, Kanagawa (JP)

(73) Assignee: Panasonic Corporation, Osaka (JP)

( * ) Notice: Subject to any disclaimer, the term of this patent is extended or adjusted under 35 U.S.C. 154(b) by 320 days.

(21) Appl. No.: 13/121,153

(22) PCT Filed: Sep. 28, 2009

(86) PCT No.: PCT/JP2009/004930
§ 371 (c)(1),
(2), (4) Date: Mar. 25, 2011

(87) PCT Pub. No.: WO2010/035497
PCT Pub. Date: Apr. 1, 2010

(65) Prior Publication Data
US 2011/0177833 A1 Jul. 21, 2011

(30) Foreign Application Priority Data
Sep. 29, 2008 (JP) .................................. 2008-250618

(51) Int. Cl.
*H04W 4/00* (2009.01)
(52) U.S. Cl.
USPC ........... 370/329; 370/328; 455/450; 455/454; 455/461; 455/509
(58) Field of Classification Search
USPC ........... 455/509, 450, 454, 461; 370/329, 328
See application file for complete search history.

(56) References Cited

U.S. PATENT DOCUMENTS

| 2006/0240838 | A1 | 10/2006 | Suh | |
| 2010/0067472 | A1* | 3/2010 | Ball et al. | 370/329 |
| 2010/0091724 | A1 | 4/2010 | Ishii | |
| 2010/0296473 | A1* | 11/2010 | Kim et al. | 370/329 |
| 2011/0116465 | A1* | 5/2011 | Miki et al. | 370/329 |
| 2011/0143796 | A1* | 6/2011 | Lee et al. | 455/507 |
| 2011/0151913 | A1* | 6/2011 | Forster et al. | 455/509 |
| 2011/0305211 | A1* | 12/2011 | Lunttila et al. | 370/329 |

FOREIGN PATENT DOCUMENTS

| JP | 2006-304312 | 11/2006 |
| WO | 2008/105316 | 9/2008 |

OTHER PUBLICATIONS

International Search Report dated Dec. 2, 2009.
N. Miki, et al., "Investigation on Optimum Coding and Multiplexing Schemes for L1/L2 Control Signals in OFDM Based Evolved UTRA Downlink," The 18th Annual IEEE International Symposium on Personal, Indoor and Mobile Radio Communications, 2007, pp. 1-6.

* cited by examiner

Primary Examiner — Asad Nawaz
Assistant Examiner — Najeebuddin Ansari
(74) Attorney, Agent, or Firm — Dickinson Wright PLLC

(57) ABSTRACT

Disclosed is a CCE+ number allocation method which reduces the ACK/NACK (Acknowledgment/Negative Acknowledgment) collision probability in a mixed system containing an LTE (Long Term Evolution) system and an LTE+ (Long Term Evolution Advanced) system. A CCE (Control Channel Element)+ number is defined by selecting a number from CCE numbers of the CCE to contain PDCCH (Physical Downlink Control Channel) allocated in a resource element region constituting CCE+ where PDCCH+ is arranged. This can prevent overlapped selection of the CCE number and the CCE+ number even when the PDCCH and the PDCCH+ are simultaneously transmitted. Thus, it is possible to reduce the collision probability of ACK/NACK correlated to the CCE number and the CCE+ number.

17 Claims, 10 Drawing Sheets

FIG.1

| CCE#1 | CCE#2 | CCE#3 | CCE#4 | CCE#5 | CCE#6 | CCE#7 | CCE#8 |
|---|---|---|---|---|---|---|---|
| | | | CCE+#4 | | CCE+#6 | | |

CCE+ NUMBER ALLOCATION METHOD AND BASE STATION DEVICE

TECHNICAL FIELD

The present invention relates to a CCE+ number assignment method and a base station apparatus in a mixed system in which an LTE (Long Term Evolution) system and an LTE+ (Long Term Evolution Advanced) system exist together.

BACKGROUND ART

Mobile communication is performed using the downlink (DL) from a radio communication base station apparatus (hereinafter abbreviated as "base station") to radio communication mobile stations (hereinafter abbreviated as "mobile stations"), and the uplink (UL) from mobile stations to a base station.

The uplink and the downlink are associated with one another, and, for example, when ARQ (Automatic Repeat Request) is applied to downlink data, a mobile station feeds a response signal indicating the result of error detection about the downlink data, back to a base station using the uplink. A mobile station performs CRC (cyclic redundancy check) check on the downlink data, and, when CRC=OK (no error), feeds ACK (acknowledgment) back to a base station as a response signal, and, when. CRC=NG (error present), feeds NACK (negative acknowledgment) to the base station as a response signal. This response signal is transmitted to a base station using an uplink control channel such as a PUCCH (physical uplink control channel).

In addition, as shown in Non-Patent Literature 1, a base station transmits control information to report downlink data resource allocation results, to mobile stations. This control information is transmitted to mobile stations using downlink control channels such as PDCCHs (physical downlink control channels). Each PDCCH is allocated to one or more CCEs. When one PDCCH is allocated to a plurality of CCEs (control channel elements), this PDCCH is allocated to a plurality of consecutive CCEs. A base station assigns any of a plurality of PDCCHs to each mobile station, according to the number of CCEs (CCE aggregation size) required to report control information, maps control information to physical resources corresponding to CCEs (control channel elements) to allocate PDCCHs to, and transmits the mapped result.

In addition, studies are underway to associate CCEs and PUCCHs in order to efficiently use communication resources in the downlink. According to this association, each mobile station can determine PUCCHs used to transmit response signals from the mobile station, based on the CCEs corresponding to the physical resources to which control information directed to the mobile station is mapped.

In this way, there are associations between the uplink and the downlink, and therefore, when coexistence of a plurality of communication systems is desired, there is a problem that frequency resources run short if the uplink and the downlink are assigned to each of a plurality of communication system. In addition, when a new communication system is added to the band used to operate an old communication system, it is preferable to allow mobile stations in the old communication system to be used as is without change in the new system. As a method of solving the above-described problems, a frequency overlay system is proposed in Patent Literature 1.

With Patent Literature 1, when an old communication system and a new communication system exist together in order to improve efficiency of use of frequencies, the new system is designed to cover the frequency of the old communication system and performs frequency scheduling including the frequency of the old communication system. In addition, a design approach is adopted where correlation between preamble channels (reference signals) used in an old communication system and preamble channels (reference signals) used in a new communication system is low to improve accuracy of channel estimation. Moreover, different control channels are provided in an old communication system and a new communication system, individually, and transmitted in different frequency bands.

CITATION LIST

Patent Literature

PTL 1
Japanese Patent Application Laid-Open No. 2006-304312

Non-Patent Literature

NPL 1
Nobuhiko Miki, Yoshihisa Kishiyama, Kenichi Higuchi, and Mamoru Sawahashi, "Investigation on Optimum Coding and Multiplexing Schemes for L1/L2 Control Signals in OFDM Based Evolved UTRA Downlink", The 18th Annual IEEE International Symposium on Personal, Indoor and Mobile Radio Communications (PIMRC'07)

SUMMARY OF INVENTION

Technical Problem

However, when a new communication system and an old communication system exist together, if control channels for control signals are provided separately, there is a problem that efficiency of use of frequencies deteriorates. Therefore, a case is possible where control channels for a new communication system and control channels for an old communication system are transmitted using the same frequency. In this case, an old communication system has defined formats of time and frequency allocation of signals, the amount of signals and so forth, so that a new communication system needs to follow the formats of the old communication system.

For example, a case will be considered where 3 GPP LTE which is an old communication system, and LTE+ (also referred to as "IMT Advanced", "LTE Advanced" and "4 G") which is a new communication system exist together. In this case, when, in an LTE+ system, control information to report a downlink data resource assignment result is transmitted to an LTE+ mobile station using a PDCCH+, if the format of LTE CCEs is used as is, the amount of information that can be transmitted is limited by the format of LTE CCEs.

On the other hand, in an LTE+ system, if the format of CCEs+ to allocate a PDCCH+ to is newly defined independent of the format of LTE CCEs, when the defined format of LTE+ CCEs+ and the format of LTE CCEs are both used, the CCE+ number to allocate a PDCCH+ to and the CCE number to allocate a PDCCH to, might overlap. This causes a problem that the location of the PUCCH+ associated with a CCE+ number and the location of the PUCCH associated with a CCE number collide in transmission resources, so that an ACK/NACK collision occurs.

It is therefore an object of the present invention to provide a CCE+ number assignment method and a base station apparatus to prevent ACK/NACK collisions in a mixed system in which an LTE system and an LTE+ system exist together.

Solution to Problem

The control channel element of LTE+ (CCE+) number assignment method that assigns a CCE+ number to CCE+ to which a first control channel is allocated, the first control channel being a downlink control channel in an Long-Term-Evolution-Advanced (LTE+) system, the CCE+ number assignment method comprising: selecting a number, as the CCE+ number, from CCE numbers of CCEs to which a second control channel is allocated, the second control channel being a downlink control channel in an LTE system and assigned to a resource element region composed of the CCEs+ to which the first control channel is allocated.

The base station apparatus comprising: a mapping section that selects a number from control channel element (CCE) numbers of CCEs to which a downlink control channel in an Long-Term-Evolution (LTE) system is allocated, the downlink control channel in the LTE being assigned to a resource element region composed of CCEs+ to which a downlink control channel in an LTE Advanced (LTE+) system is allocated, holds a CCE+ number assignment mapping representing assigned as CCE+ numbers, selects a certain CCE+ number from the CCE+ number assignment mapping and assigns a region of the certain CCE+ number to the downlink control channel in the LTE+ system; and a transmission section that transmits the downlink control channel in the LTE+ system assigned to the region of the certain CCE+ number.

Advantageous Effects of Invention

According to the present invention, it is possible to reduce ACK/NACK collisions in a mixed system in which an LTE system and an LTE+ system exist together.

BRIEF DESCRIPTION OF DRAWINGS

FIG. 1 shows an example of allocation of CCEs and CCEs+ according to Embodiment 1 of the present invention;

FIG. 3 shows an example of allocation of CCEs and CCEs+ according to Embodiment 1;

FIG. 7 shows an example of allocation of CCEs and CCEs+ according to Embodiment 2 of the present invention;

FIG. 8 shows an example of allocation of CCEs and CCEs+ according to Embodiment 2;

FIG. 9 shows another example of allocation of CCEs and CCEs+ according to Embodiment 2.

DESCRIPTION OF EMBODIMENTS

Figure 2:
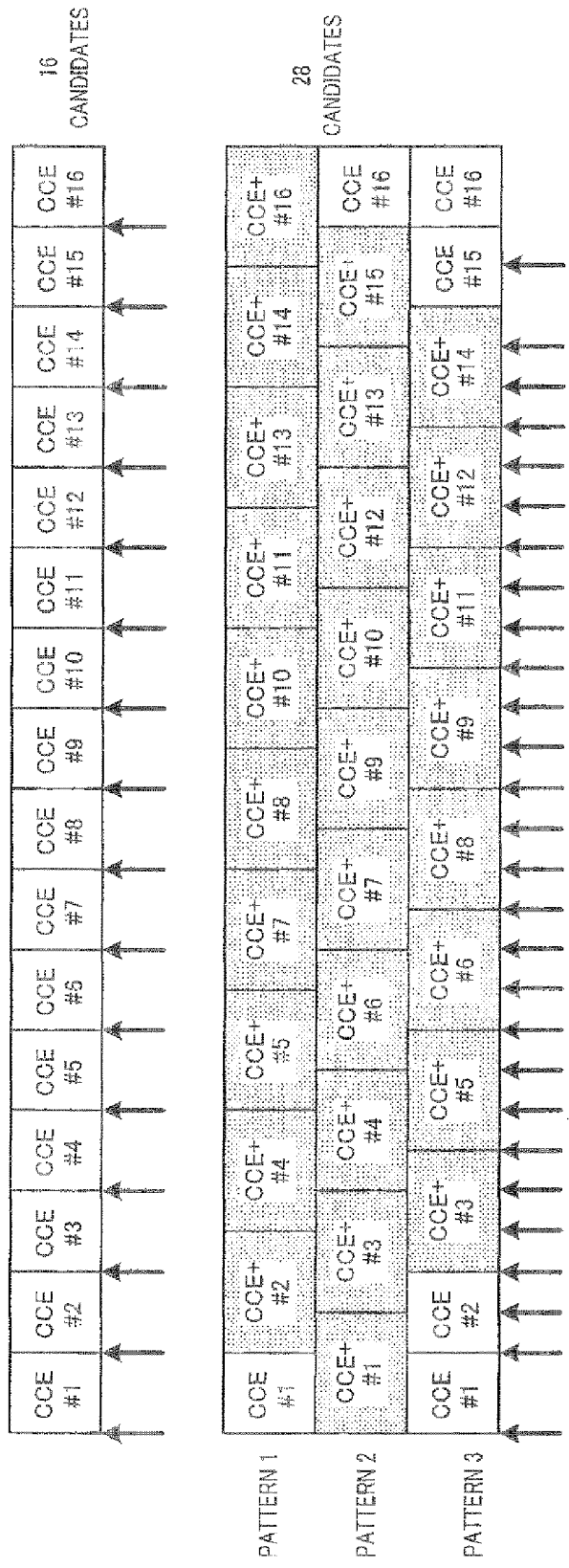
FIG. 2 shows an allocation example which can be adopted in a case in which a resource element region composed of three CCEs are assigned to two CCEs+.

Now, embodiments of the present invention will be described in detail with reference to the accompanying drawings.

First, communication systems assumed in the embodiment will be explained before explanation of specific configuration and operation according to the embodiment.

(1) The following systems are assumed as an old communication system and a new communication system. Old communication system: LTE (Long Term Evolution) New communication system: LTE+ (also referred to as "LTE Advanced", "IMT Advanced", or "4 G").

(2) In an LTE system, CCE numbers for PDCCHs are associated with PUCCHs. A PDCCH is a downlink control channel for an LTE system. Meanwhile, a PUCCH is an uplink control channel for an LTE system, and also is a control channel for feedback of ACK or NACK, and therefore may also be referred to as "ACK/NACK channel."

(3) In an LTE system, a CCE (one PDCCH unit) is composed of 36 REs (resource elements).

Embodiment 1

With the present embodiment, a case will be explained where an LTE+ CCE+ is composed of 54 REs, and three LTE CCEs correspond to two CCEs+. In this case, a number is selected, as a CCE+ number, from the CCE numbers of CCEs to allocate PDCCHs to, which are assigned to a resource element region composed of CCEs+ to allocate PDCCHs+ to. A PDCCH+ is an LTE+ system downlink control channel. By this means, even if an LTE PDCCH and an LTE+ PDCCH+ are transmitted at the same time, the same number is not selected between CCE numbers and CCE+ numbers. As a result of this, it is possible to prevent a collision between the PUCCH+ location associated with the CCE+ number and the PUCCH location associated with the CCE number in transmission resources to reduce the rate of ACK/NACK collisions.

FIG. 1 shows an example of allocation of CCEs and CCEs+ according to the present embodiment. Here, in FIG. 1, CCE #i represents that a CCE number is i, and also CCE+ #i represents that a CCE+ number is i.

In the example shown in FIG. 1, a resource element region composed of three CCEs, CCE #4, CCE #5 and CCE #6, is divided into two regions. Then, two numbers, to be more specific, the beginning number "4" and the end number "6" are selected from three CCE numbers (4, 5 and 6) assigned to the resource element region composed of three CCEs, and the selected numbers are assigned as CCE+ numbers.

With LTE+, control information, including for example, uplink information, mobile station IDs, data sizes, modulation schemes, uplink transmission power information and demodulation information are assigned to PDCCHs+ and transmitted. It is anticipated that the amount of control information that should be transmitted with LTE+ is greater than with LTE due to increase in the number of antennas and assigned bands. Therefore, the size of a CCE+ needs to be greater than the size of a CCE. In the allocation example, a CCE+ is composed of 36×3/2=54 REs. In this way, according to the present embodiment, a size greater than the size of a CCE is assured for a CCE+.

In this case, CCEs and CCEs+ are allocated as shown in FIG. 1 to prevent PDCCHs from being allocated to CCE #4 to #6 in an LTE system when PDCCHs+ are allocated to CCE+ #4 and CCE+ #6 in an LTE+ system. In addition, when PDCCHs are allocated to CCE #4 to #6 in an LTE system, PDCCHs+ are prevented from being allocated to CCEs+ #4 and #6 in an LTE+ system. In this way, PDCCHs and PDCCHs+ are allocated using common rules between LTE and LTE+.

If ACK/NACK is transmitted using a PDCCH and a PDCCH+ allocated as described above, the same number is not selected between CCE numbers to allocate PDCCHs to and CCE+ numbers to allocate PDCCHs+ to, so that it is possible to prevent ACK/NACK collisions. By this means, an LTE+ mobile station can transmit an ACK/NACK signal in synchronization with an LTE mobile station.

Here, FIG. 1 shows allocation of CCE numbers and CCE+ numbers, and, at a time of transmission, the order of CCEs and CCEs+ are exchanged by interleaving CCEs and CCEs+ on a per REG (resource element group) basis, where an REG is obtained by dividing CCEs and CCEs+ every four REs.

FIG. 2 shows an example of allocation that can be adopted in a case in which a resource element region composed of three CCEs is assigned to two CCEs+. Here, pattern 2 in FIG. 2 is the same as the allocation example shown in FIG. 1.

In pattern 1 in FIG. 2, the resource element region composed of CCE #2 to CCE #4 is assigned to two CCEs+. In pattern 2 in FIG. 2, the resource element region composed of CCE #1 to CCE #3 is assigned to two CCEs+. In pattern 3 in FIG. 2, the resource element region composed of CCE #3 to CCE #5 is assigned to two CCEs+. In this way, when a resource element region composed of three CCEs is assigned to two CCEs+, it is possible to adopt three patterns as shown in FIG. 2.

Candidates for CCE+ beginning positions when these patterns are employed, are shown by arrows in FIG. 2. As seen from FIG. 2, if there are sixteen CCEs (CCE #1, CCE #2, . . . , CCE #16) to which PDCCHs can be allocated, in an LTE system, the number of candidates for CCE beginning positions is 16. By contrast with this, there are three patterns (pattern 1, pattern 2 and pattern 3) that can be adopted in an LTE+ system, so that the number of candidates for CCE+ beginning positions is 28. In this way, with LTE+, the number of candidates for CCE+ beginning positions is greater than the number of candidates for CCE beginning positions.

Increase in the number of candidates for beginning positions leads to increase in the number of times of blind detections to detect whether or not there are resources assigned to a mobile station in the receiving side. As a result of this, the amount of processing in a mobile station increases. Therefore, another allocation example will be shown where the number of times of blind detections decreases to reduce the processing load in a mobile station.

Allocation Example A

Figure 3:
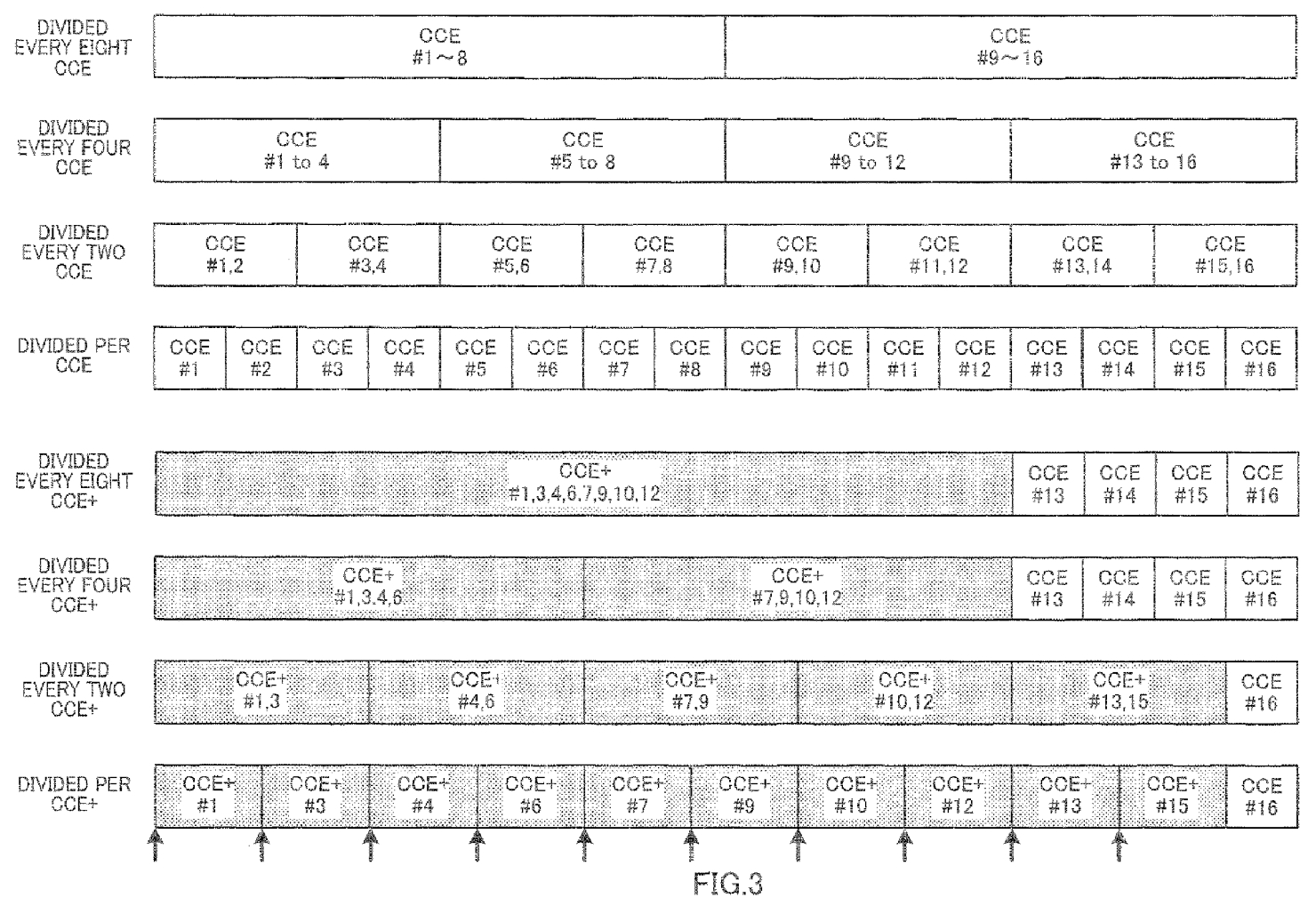

FIG. 3 shows an allocation example A that can reduce the number of times of blind detections.

In allocation example A, CCEs+ are allocated to be stuffed from the beginning of a resource element region composed of CCE #1 to CCE #16. Here, in allocation example A, the number j of CCEs represents that a CCE aggregation size to allocate PDCCHs is j, and the number j of CCEs+ represents that the aggregation size of CCEs+ to allocate PDCCHs+ to, is j.

The allocation in a case in which a resource element region is divided per CCE+ in allocation example A is the same as pattern 2 in FIG. 2. That is, candidates for beginning positions in a case in which a resource element region is divided per CCE, are the beginning position of CCE #i (CCE number is i) satisfying CCE #i mod 3=1, and a position obtained by shifting from this beginning position of CCE #i by a resource element region (fifty-four REs) constituting one CCE+. Here, "CCE #i mod m" represents the remainder resulting from dividing CCE #i by m (the same applies hereinafter).

In this way, an allocation is adopted where the beginning position of a resource element region composed of two consecutive CCEs+ matches the beginning position of CCE #i satisfying CCE #i mod 3=1, so that it is possible to limit candidates for beginning positions to the beginning position of CCE #i and a position obtained by shifting from this beginning position of CCE #i by a resource element region (fifty-four REs) constituting one CCE+, and therefore it is possible to narrow down candidate positions for blind detections in the receiving side.

In addition, when the number of CCEs+ is K (K is an integer and K≥2), a candidate for a CCE+ beginning position is the beginning position of CCE #i satisfying CCE #i mod (3×K/2)=1.

As described above, with allocation example A, it is possible to limit CCE+ beginning positions, so that it is possible to reduce the number of times of blind detections and the amount of reception processing in the receiving side.

In addition, CCEs+ are allocated to be stuffed, leaving no space between them, from the beginning of a resource element region, so that it is possible to secure a continuous remaining resource element region. For example, when a CCE is composed of thirty-six REs, a CCE+ is composed of fifty-four REs and there are sixteen CCEs (CCE #1, CCE #2, . . . , CCE #16) to allocate PDCCHs to, it is possible to allocate only two LTE+ PDCCHs in a case in which a resource element region is divided every four CCEs+, so that there is a remaining resource element region corresponding to 144 REs. In this case, CCEs+ are allocated to be stuffed from the beginning of a resource element region, so that it is possible to secure continuous remaining resource element region. As a result of this, as shown in FIG. 3, it is possible to allocate four consecutive CCEs (CCE #13, CCE #14, CCE #15, CCE #16) to the remaining resource element region.

As shown in FIG. 3, CCE #13 to CCE #16 in a case in which a resource element region is divided per CCE, may be allocated to this remaining resource region and used. In addition, CCE #13, 14 and CCE #15, 16 in a case in which a resource element region is divided every two CCEs, may be allocated and used. Moreover, CCE #13 to #16 in a case in which a resource element region is divided every four CCEs may be allocated and used. Furthermore, CCE+ #13 and CCE+ #15 in a case in which a resource element region is divided per CCE+ may be allocated and used, and CCEs+ #13, 15 in a case in which a resource element region is divided every two CCE+ may be allocated and used.

In this way, with allocation example A, it is possible to secure a continuous remaining resource element region by allocating CCEs+ to be stuffed, leaving no space, from the beginning of a resource element region, so that it is possible to efficiently use resources by allocating PDCCHs, or PDCCHs+ corresponding to a small number of CCEs+, to the remaining resource element region.

As described above, with allocation example A, a number is selected, as a CCE+ number, from the CCE numbers of CCEs to allocate PDCCHs to, which are assigned to a resource element region composed of CCEs+ to allocate PDCCHs+ to. By this means, even if PDCCHs and PDCCH+ are transmitted at the same time, the same number is not selected between CCE numbers and CCE+ numbers, so that it is possible to reduce the rate of ACK/NACK collisions associated with CCE numbers and CCE+ numbers.

In addition, with allocation example A, CCEs+ are allocated to be stuffed from the beginning of a resource element region to which LTE PDCCHs can be allocated. By this means, it is possible to limit CCE+ beginning positions, so that it is possible to reduce the number of times of blind detections and the amount of reception processing in a mobile station in the receiving side. In addition, when the number of CCEs+ is great, it is possible to secure a continuous remaining resource element region, and allocate PDCCHs, or PDCCHs+ corresponding to a small number of CCEs, so that it is possible to efficiently use resources.

Allocation Example B

Figure 4:
FIG. 4 shows another example of allocation of CCEs and CCEs+ according to Embodiment 1.

FIG. 4 shows allocation example B as another allocation example.

With LTE, a method of associating CCE numbers with mobile station user IDs, are being studied to reduce the number of times of CCE blind detection. In this case, CCE numbers that can be received by LTE mobile stations are limited.

For example, with allocation example A, when CCE numbers that can be received by an LTE mobile station are only #1 to #12, if an LTE+ mobile station uses CCE+ #9 in a case in which a resource element region is divided per CCE+, the LTE mobile station cannot use CCE #5 to 8 and also CCE #9 to 12 in a case in which a resource element region is divided every four CCEs. Therefore, candidates for CCE numbers available for an LTE mobile station are only CCE #1 to 4.

Likewise, with allocation example A, when CCE numbers that can be received by an LTE mobile station are only #1 to #12, if an LTE+ mobile station uses CCE+ #9 in a case in which a resource element region is divided per CCE, the LTE mobile station cannot use CCE #1 to 8 and also CCE #9 to 16 in a case in which a resource element region is divided every eight CCEs. As a result of this, there is no CCE number available for an LTE mobile station.

With allocation example A, when the number of CCEs and CCEs+ increases, the beginning position of a resource element region composed of j CCEs is shifted from the beginning position of a resource element region composed of j CCEs+. Therefore, when the number of CCEs (or CCEs+) increases, if a certain CCE+ number (or CCE number) is being used, the number of available CCE (or CCE+ number) numbers decreases.

Therefore, an allocation example B will be presented where, even if the number j of CCEs and the number j of CCE+ are great, the beginning position of a resource element region composed of j CCEs matches the beginning position of a resource element region composed of j CCEs+.

With an example shown in FIG. 4 in which a resource element region is divided per CCE+, CCE+ #1 and CCE+ #3, CCE #4, and CCE+ #5 and CCE+ #7 are allocated in this order from the beginning of the resource element region composed of sixteen CCEs. In this way, by allocating two CCE+ #1 and CCE+ #3, one CCE #4 and two CCE+ #5 and CCE+ #7 are allocated to a resource element region, from the beginning in this order, it is possible to match the beginning position of CCE+ #5 with the beginning position in a case in which a resource element region is divided every four CCEs to satisfy CCE #i mod 4=1.

Incidentally, it is possible to allocate CCE+ #1 and CCE+ #3 in a case in which a resource element region is divided per CCE+ to match the beginning positions in a case in which a resource element region is divided every two CCEs+. In this case, however, the resource element region between CCE+ #1 and CCE+ #3 has eighteen REs, and therefore cannot be assigned a CCE (thirty-six REs), so that an unnecessary region is generated. Therefore, if a CCE+ is composed of fifty-four REs, it is preferable to allocate CCEs+ in a case in which a resource element region is divided per CCE+, as allocation example B.

In addition, with allocation example B, if a resource element region is divided every K CCEs+, here K=2, 4 and 8, the beginning position of each CCE+ is the beginning position of CCE #i satisfying CCE #i mod (2×K)=1.

To be more specific, with allocation example B shown in FIG. 4, candidates for the beginning positions in a case in which a resource element region is divided every two CCEs+, are the beginning positions of CCE #1, CCE #5, CCE #9 and CCE #13, candidates for the beginning positions in a case in which a resource element region is divided every four CCEs+, are the beginning positions of CCE #1 and CCE #9, and a candidate for the beginning position in a case in which a resource element region is divided every eight CCEs+ is the beginning position of CCE #1.

In this way, the beginning positions match between the case in which a resource element region is divided every two CCEs+ and the case in which a resource element region is divided every four CCEs, and the beginning positions match between the case in which a resource element region is divided every four CCEs+ and the case in which a resource element region is divided every eight CCEs. As a result of this, as compared to allocation example A, it is possible to reduce cases in which a plurality of CCEs are unavailable when a certain CCE+ is selected.

Assume that when CCE numbers that can be received by an LTE mobile station are only #1 to #12, an LTE+ mobile station uses CCE+ #9 in a case in which a resource element is divided per CCE. In this case, with allocation example A, the LTE mobile station cannot use CCE #5 to 8 and CCE #9 to 12 in a case in which a resource element region is divided every four CCEs. By contrast with this, with allocation example B, the LTE mobile station cannot use only CCE #5 to 8.

In addition, assume that CCE numbers that can be received by an LTE mobile station are only #1 to #12, an LTE mobile station uses CCE+ #9 in a case in which a resource element region is divided per CCE+. In this case, with allocation example A, the LTE mobile station cannot use CCE #1 to 8 and also CCE #9 to 16 in a case in which a resource element region is divided every eight CCEs. By contrast with this, with allocation B, the LTE mobile station cannot use only CCE #1 to 8.

Here, allocation B may be an allocation example in which a basic number of CCEs is 4. That is, with allocation example B, CCEs+ are allocated based on a resource element region composed of a basic number of CCEs (hereinafter referred to as "basic resource element region").

To be more specific, if possible, a plurality of PDCCHs+ are assigned to a basic resource element region, like a case in which a resource element region is divided per CCE+. With allocation example B shown in FIG. 4, two CCE+ #1 and CCE+ #3 in a case in which a resource element region is divided per CCE+, are allocated to a basic resource element region (CCE #1 to CCE #4).

Like in a case in which a resource element region is divided every two CCEs+, if it is possible to allocate only one PDCCH+ assigned to two CCEs+ to a basic resource element region, one PDCCH+ assigned to two CCEs+ is allocated, and then, the beginning of a region obtained by multiplying the basic resource element region by an integer is the beginning position of a region in which a PDCCH+ is assigned to the next two CCEs+.

With allocation example B shown in FIG. 4, CCE+ #1, 3 in a case in which a resource element region is divided every two CCEs+, are allocated to a basic resource element region (CCE #1 to CCE #4). Then, the end position of the basic resource element region is the beginning position of the next two CCEs+ of CCE+ #5, 7.

When none of PDCCH+ corresponding to four CCEs+ or eight CCEs+ can be assigned to a basic resource element region, like in a case in which a resource element region is divided every four CCEs+ or eight CCEs+, a PDCCH+ corresponding to four CCEs+ or eight CCEs+ is assigned over a basic resource element region. When only one resource element region composed of four CCEs+ or eight CCEs+ is included in a basic resource element region, each beginning position in a case in which a resource element region is divided every four CCEs+ or eight CCEs+ is the end position of a region twice as large as the basic resource element region. When the number of basic resource elements included in a region divided every four CCEs+ or eight CCEs+ is equal to or more than two and less than four, each beginning position in a case in which a resource element region is divided every four CCEs+ or eight CCEs+ is the end position of a region four times a basic resource element region.

In this way, with allocation example B, one of the numbers of CCEs to allocate a PDCCH to, is selected as the basic number of CCEs, and the beginning position of a resource element region composed of CCEs+ to allocate a PDCCH+ to, matches the beginning position of a region obtained by multiplying a basic resource element region by an integer. By this means, even if CCEs and CCEs+ exist together, it is possible to increase available CCE numbers or CCE+ numbers, as compared to allocation example A. As described above, allocation B is suitable for a case in which the number of LTE mobile stations is great because the allocation of LTE+ PDCCHs+ little influence the allocation of LTE PDCCHs.

[Configuration of a Base Station Apparatus]

Figure 5:
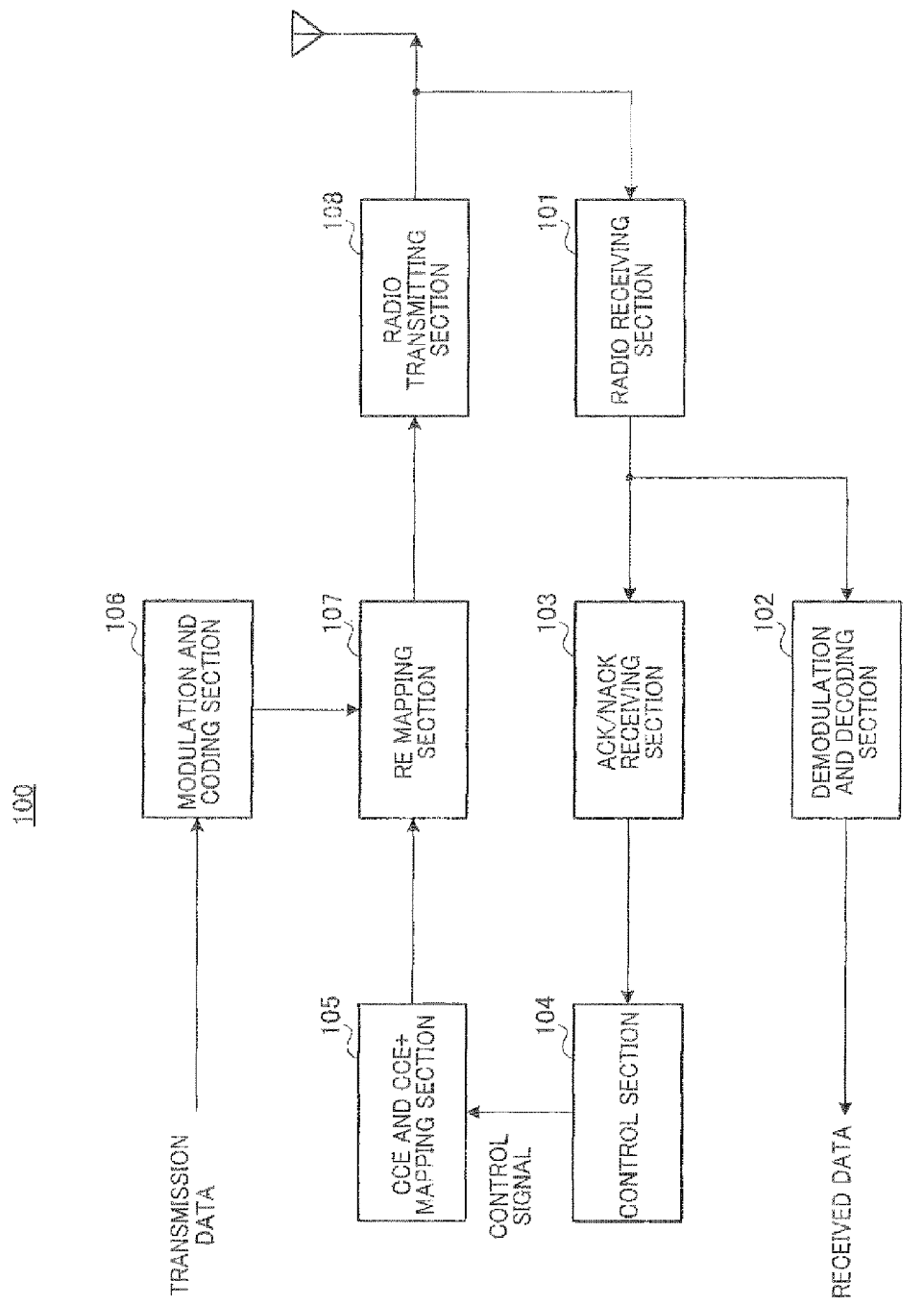
FIG. 5 shows primary components in a base station apparatus according to Embodiment 1.

FIG. 5 shows primary components in a base station that allocates PDCCHs or PDCCHs+ to CCEs or CCEs+ using CCE+ number assignment mapping for assignment shown in the above-described allocation example A or allocation example B.

Base station 100 shown in FIG. 5 has radio receiving section 101, demodulation and decoding section 102, ACK/NACK receiving section 103, control section 104, CCE and CCE+ mapping section 105, modulation and coding section 106, RE (resource element) mapping section 107 and radio transmitting section 108.

Radio receiving section 101 receives a signal transmitted from a mobile station via an antenna, applies radio processing such as down-conversion on the signal and outputs a received signal after radio processing to demodulation and decoding section 102 and ACK/NACK receiving section 103.

Demodulation and decoding section 102 demodulates and decodes the received signal to acquire received data.

ACK/NACK receiving section 103 receives an ACK/NACK signal from a mobile station, and outputs an ACK/NACK signal to control section 104.

Control section 104 generates control signals. Control signals include uplink and downlink assignment information, power control information and so forth. Control section 104 outputs control signals to CCE and CCE+ mapping section 105.

CCE and CCE+ mapping section 105 assigns PDCCHs or PDCCHs+ including control signals, to CCEs or CCEs+. Here, CCE and CCE+ mapping section 105 allocates PDCCHs or PDCCHs+ including control signals to CCEs or CCEs+, based on CCE+ number assignment mapping according to the above-described allocation example A or allocation example B. CCE and CCE+ mapping section 105 employs allocation example A or allocation example B, so that it is possible to reduce the number of candidates for beginning positions in blind detection on the receiving side. CCE and CCE+ mapping section 105 outputs PDCCH or PDCCH+ assignment information to RE mapping section 107.

Modulation and coding section 106 modulates and encodes transmission data to acquire a modulated signal, and outputs the modulated signal to RE mapping section 107.

RE mapping section 107 maps PDCCHs or PDCCHs+ to REs, according to assignment information given by CCE and CCE+ mapping section 105, maps the modulated signal to REs, and outputs a modulated signal after mapping to radio transmitting section 108.

Radio transmitting section 108 applies radio processing such as up-conversion to the modulated signal and transmits the result to a mobile station via an antenna.

[Configuration of a Mobile Station]

Figure 6:
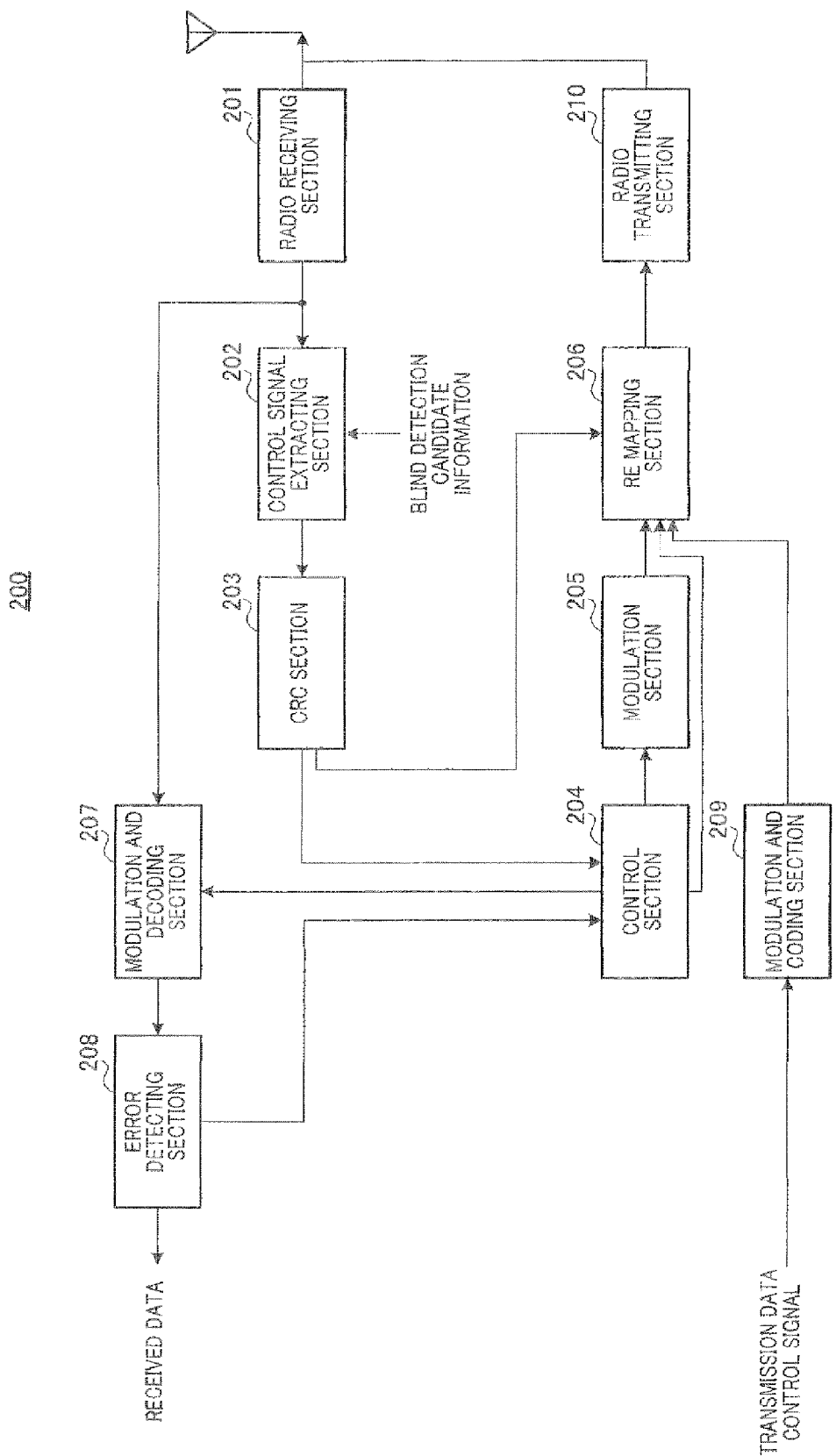
FIG. 6 shows primary components in a mobile station according to Embodiment 1.

FIG. 6 shows primary components in a mobile station that receives LTE+ system signals transmitted from base station 100. Mobile station 200 shown in FIG. 6 has radio receiving section 201, control signal extracting section 202, CRC (cyclic redundancy check) section 203, control section 204, modulation section 205, RE mapping section 206, demodulation and decoding section 207, error detecting section 208, modulation and coding section 209, and radio transmitting section 210.

Radio receiving section 201 receives a signal transmitted from a base station via antenna, applies radio processing such as down-conversion to the signal, and outputs a received signal after radio processing to control signal extracting section 202 and demodulation and decoding section 207.

Control signal extracting section 202 receives blind detection candidate information, as input, and performs blind detection of CCEs+ directed to mobile station 200 from PDCCHs+. Blind detection candidate information indicates candidates for the beginning position of each CCE+, and control signal extracting section 202 searches for CCEs+ assumed as candidates for beginning positions to extract CCEs+ directed to mobile station 200. Upon extracting a control signal directed to mobile station 200, control signal extracting section 202 outputs the control signal to CRC section 203.

CRC section 203 performs CRC check on the control signal outputted from control signal extracting section 202. For example, CRC section 203 demasks CRC bits with the ID number of mobile station 200, and, when CRC=OK (no error), outputs the control signal to control section 204 and RE mapping section 206. In addition, CRC section 203 outputs a CRC detection result to control section 204. Moreover, CRC section 203 determines an ACK/NACK transmission position, based on the CCE+ number from which a control signal directed to mobile station 200 is extracted, and outputs information about the determined transmission position to RE mapping section 206.

Control section 204 extracts downlink assignment information and uplink assignment information from control signals, and determines an ACK/NACK transmission position based on CCE+ numbers. Control section 204 outputs downlink assignment information to demodulation and decoding section 207. In addition, control section 204 outputs uplink assignment information to RE mapping section 206. Moreover, control section 204 generates ACK/NACK, based on the error detection result from error detecting section 208, and outputs ACK/NACK to modulation section 205. Here, if the CRC check result from CRC section 203 represents CRC=NG (error present), it is not possible to generate assignment information, so that output of ACK/NACK is cancelled.

Modulation section 205 modulates ACK/NACK information and outputs modulated ACK/NACK to RE mapping section 206.

RE mapping section 206 maps transmission data and ACK/NACK to REs, based on uplink assignment information and the ACK/NACK transmission position, and outputs the result to radio transmitting section 210.

Demodulation and decoding section 207 demodulates and decodes a received signal, based on downlink assignment information outputted from control section 204, and outputs received data to error detecting section 208.

Error detecting section 208 detects whether or not there is an error in received data, and outputs the error detection result to control section 204. In addition, error detecting section 208 outputs received data to a received data processing section (not shown).

Modulation and coding section 209 modulates and encodes transmission data and control signals to acquire a modulated signal, and outputs the acquired modulated signal to RE mapping section 206.

Radio transmitting section 210 applies radio processing such as up-conversion to the modulated signal, and transmits the result to base station 100 via antenna.

The CCE+ number assignment method, and the primary components in a base station and an LTE+ mobile station according to the present embodiment have been explained.

As described above, with the present embodiment, a number is selected, as a CCE+ number, from the CCE numbers of CCEs to allocate PDCCHs to, which are assigned to a resource element region composed of CCEs+ to allocate PDCCHs+ to. By this means, the same number is not selected between the CCE numbers of CCEs to allocate PDCCHs to, and the CCE+ numbers of CCE+ to allocate PDCCHs+ to, so that it is possible to prevent ACK/NACK collisions.

In addition, CCEs+ are allocated to be stuffed from the beginning of a resource element region to which PDCCHs can be allocated. By this means, it is possible to limit the beginning positions of CCEs+, so that it is possible to reduce the number of times of blind detections and the amount of reception processing in a mobile station in the receiving side. In addition, if the number of CCEs+ is great, is possible to secure a continuous remaining resource element region, and allocate CCEs corresponding to a small number of CCEs+, or CCEs+, so that it is possible to effectively use resources.

Moreover, one of the numbers of CCEs to allocate PDCCHs to, is selected as a basic number of CCEs, and the beginning position of a resource element region composed of CCEs+ to allocate PDCCHs+ to; matches the beginning position of a region obtained by multiplying a basic resource element region by an integer. By this means, it is possible to increase available CCE numbers or CCE+ numbers, and allocation of PDCCHs+ little influence allocation of PDCCHs, so that it is possible to improve efficiency of use of frequencies even if the number of LTE mobile stations is great.

Embodiment 2

With the present embodiment, a case will be explained where a LTE+ CCE+ is composed of forty-eight REs, and four LTE CCEs correspond to three CCEs+. In this case, like in Embodiment 1, a number is selected, as a CCE+ number, from the CCE numbers of CCEs to allocate PDCCHs to, which are assigned to a resource element region composed of CCEs+ to allocate PDCCH+ to. By this means, even if LTE PDCCHs and LTE+ PDCCHs+ are transmitted at the same time, the same number is not selected between CCE numbers and CCE+ numbers, so that it is possible to reduce the rate of collisions of ACK/NACK associated with CCE numbers and CCE+ numbers.

Figure 7:
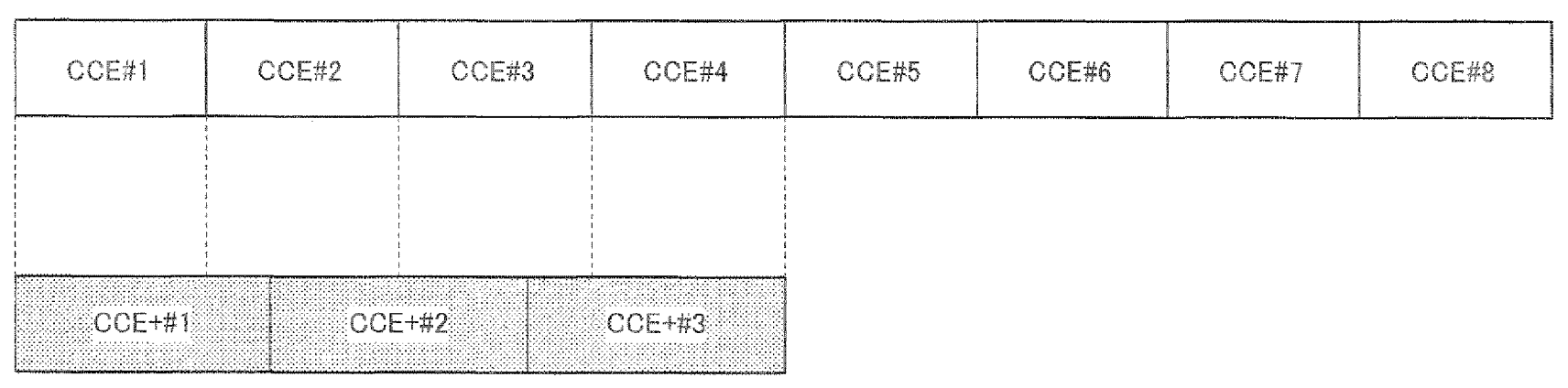

FIG. 7 shows an allocation example of CCEs and CCEs+ according to the present embodiment.

In the example shown in FIG. 7, a resource element region composed of four CCEs of CCE #1 to CCE #4 is divided into three CCEs+. Then, three numbers, to be more specific, "1", "2", "3" are selected in this order, from four CCE numbers (1, 2, 3, 4) assigned to the resource element region composed of four CCEs, and the selected numbers are assigned as CCE+ numbers.

As described above, it is anticipated that the amount of control information that should be transmitted with LTE+ is greater than with LTE, due to increase in the number of antennas and assigned bands. Therefore, the size of a CCE+ needs to be greater than the size of a CCE. With the allocation example, a CCE+ is composed of 36×4/3=48 REs. In this way, with the present embodiment, a size greater than the size of a CCE is assured for a CCE+.

In this case, when PDCCHs+ are allocated to CCE+ #1, #2 and #3 in a LTE+ system, CCEs and CCEs+ are allocated as shown in FIG. 7, so that PDCCHs are prevented from being allocated to CCE #1 to #4 in an LTE system. Meanwhile, when PDCCHs are allocated to CCE #1 to #4 in an LTE system, PDCCHs+ are prevented from being allocated to CCE+ #1 to #4.

In this way, PDCCHs and PDCCHs+ are allocated using common rules between LTE and LTE+. By transmitting ACK/NACK using PDCCHs and PDCCHs+ allocated as described above, the same number is not selected between the CCE numbers of CCEs to allocate PDCCHs to, and the CCE+ numbers of CCEs+ to allocate PDCCHs+ to, so that it is possible to prevent ACK/NACK collisions. By this means, an LTE+ mobile station can transmit an ACK/NACK signal at the same time as an LTE mobile station does so.

Here, FIG. 7 shows allocation of CCE numbers and CCE+ numbers, and, at a time of transmission, the order of CCEs and CCEs+ are exchanged by interleaving CCEs and CCEs+ on a per REG (resource element group) basis, where an REG is obtained by dividing CCEs and CCEs+ every four REs.

Allocation Example C

Figure 8:
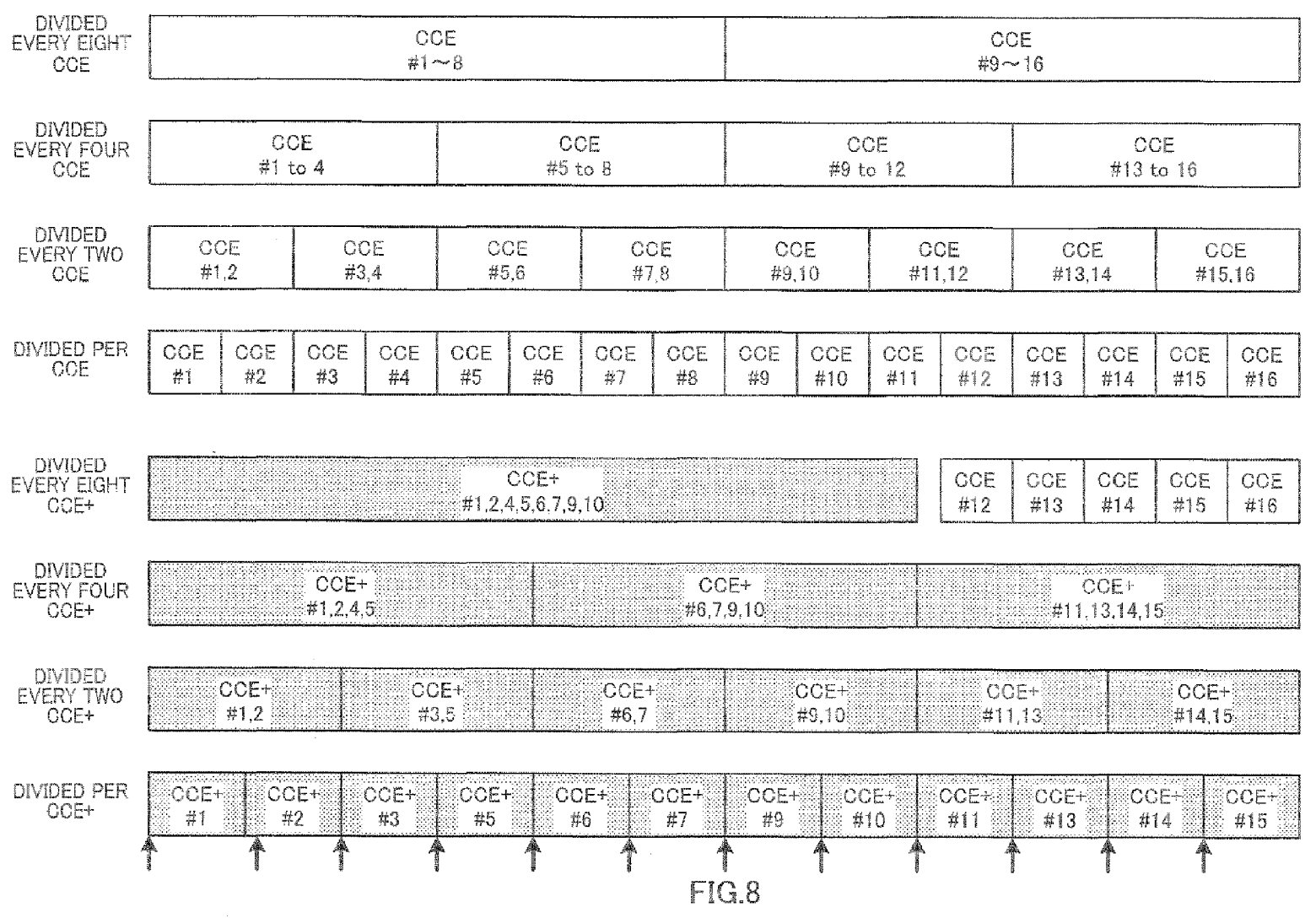

FIG. 8 shows allocation example C in which it is possible to reduce the number of times of blind detections.

With allocation example C, CCEs+ are allocated to be stuffed from the beginning of a resource element region composed of CCE #1 to CCE #16. That is, candidates for beginning positions in a case in which a resource element region is divided per CCE, are the beginning position of CCE #i (CCE number is i) satisfying CCE #i mod 4=1, a position obtained by shifting from this beginning position of CCE #i by a resource element region composed of one CCE+ (forty-eight REs) and a position obtained by shifting from this beginning position of CCE #i by a region (ninety-six REs) twice as large as a resource element region composed of one CCE+.

In this way, by adopting an allocation in which the beginning position of a resource element region composed of consecutive three CCEs+ matches the beginning position of a resource element region of CCE #i satisfying CCE #i mod 4=1, it is possible to limit candidates for beginning positions, to the beginning position of CCE #i , a position obtained by shifting from this beginning position of CCE #i by (48×K) REs and a position obtained by shifting from this beginning position of CCE #i by (96×K) REs, so that it is possible to narrow down candidate positions for blind detection in the receiving side.

In addition, when the number of CCEs+ is K (K is an integer and K≥2), a candidate for the beginning positions of a CCE+ is the beginning position of CCE #i satisfying CCE #i mod (4×K)=1.

As described above, with allocation example C, it is possible to limit CCE+ beginning positions, so that it is possible to reduce the number of times of blind detections and the amount of reception processing in the receiving side.

In addition, CCEs+ are stuffed to be allocated, leaving no space, from the beginning of a resource element region, so that it is possible to allocate CCEs+ without a remainder unless the resource element region is divided every more than four CCEs.

Allocation Example D

Figure 9:
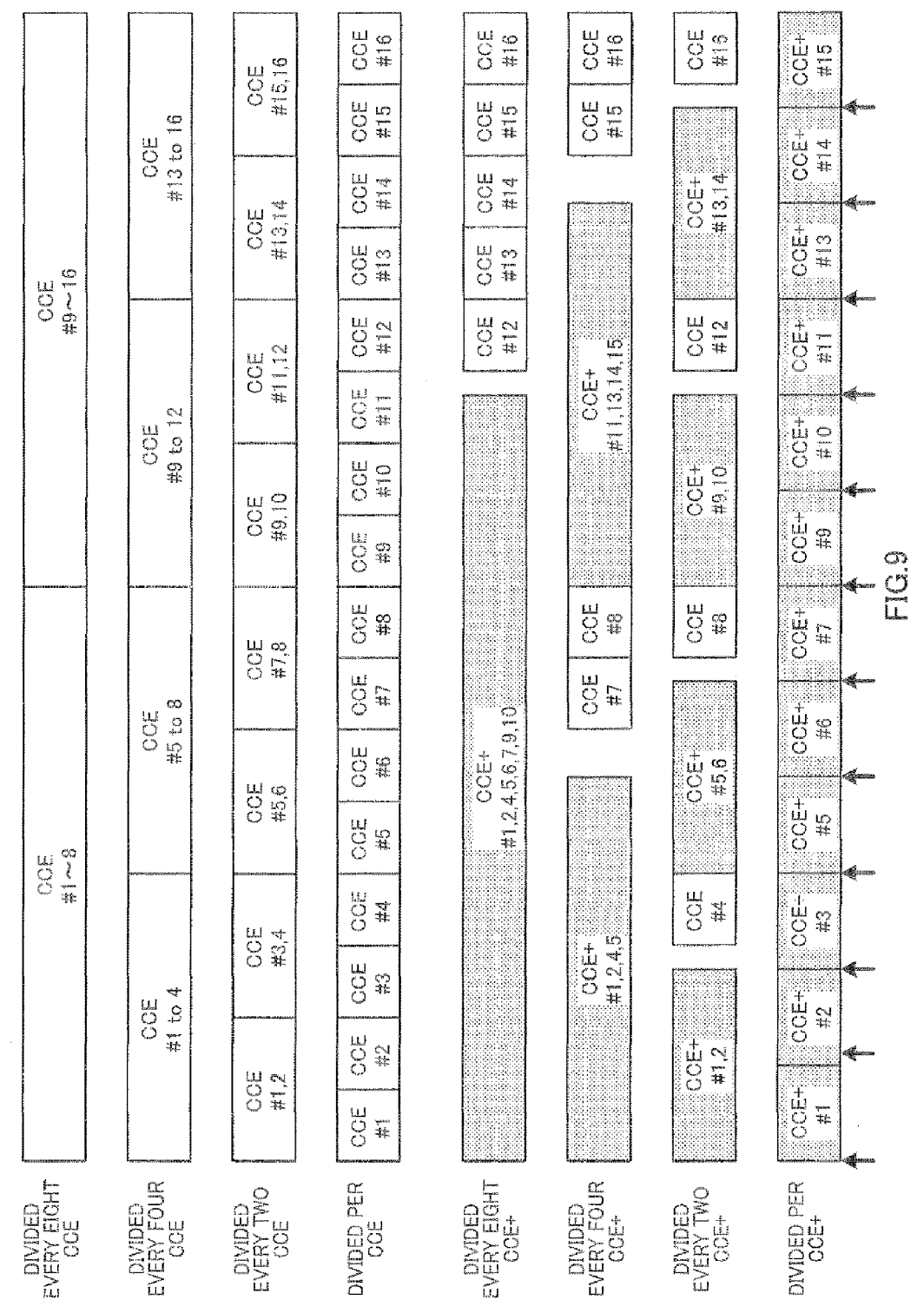

FIG. 9 shows allocation example as another allocation example.

With the above-described allocation example C, like in allocation example A, when CCE numbers that can be received by an LTE mobile station are only #1 to #12, if an LTE+ mobile station uses CCE+ #3, 5 in a case in which a resource element region is divided every two CCEs+, the LTE mobile station cannot use CCE #3 to CCE #6 in a case in which a resource element region is divided per CCE, and cannot use CCE #5 to 8 and CCE #9 to 12 in a case in which a resource element region is divided every four CCEs either.

As described above, with allocation example C, like in allocation example A, when the number of CCEs and the number of CCEs+ are greater, the beginning position of a resource element region composed of j CCEs is shifted from the beginning position of a resource element region composed of j CCEs+. As a result of this, when the number of CCEs (or CCEs+) is greater, if a certain CCE+ number is being used, the number of available CCE numbers (or CCE+ numbers) decreases.

Therefore, allocation example D will be presented in which, when the number j of CCEs and the number j of CCEs+ are great, the beginning position of a resource element region composed of j CCEs matches the beginning position of a resource element region composed of j CCEs+.

With allocation example D shown in FIG. 9, a case is set to prevent decrease in resources for LTE CCEs when LTE+ CCEs+ are allocated to a resource element region composed of sixteen CCEs, from the beginning.

With allocation example D shown in FIG. 9, like in allocation example B, when the number of CCEs+ is K (K=2, 4, 8), the beginning position of CCEs+ is a position satisfying CCE #i mod (2×K)=1.

Meanwhile, the number of CCEs+ is K (K=1), like allocation example C, candidates for beginning positions in a case in which a resource element region is divided per CCE+, are the beginning position of CCE #i (CCE number is i) satisfying CCE #i mod 4=1, a position obtained by shifting from this beginning position of CCE #i by forty-eight REs and a position obtained by shifting from this beginning position of CCE #i by ninety-six REs.

By this means, the beginning positions in a case in which a resource element region is divided every two CCEs+ match the beginning positions in a case in which a resource element region is divided every four CCEs, and the beginning positions in a case in which a resource element region is divided every four CCEs+ match the beginning positions in a case in which a resource element region is divided every eight CCEs. In this way, by matching the beginning position in a case in which a resource element region is divided every j CCEs+ with the beginning position in a case in which a resource element region is divided every 2j CCEs, it is possible to reduce cases in which a plurality of CCEs are unavailable if a certain CCE+ is selected.

For example, when an LTE+ mobile station selects CCE+ #5, 6 in a case in which a resource element region is divided every two CCEs, CCEs+ unavailable for an LTE mobile station are CCE #5, #6 and #7 in a case in which a resource element region is divided per CCE, CCE #5, 6, and CCE #7, 8 in a case in which a resource element region is divided every two CCEs, CCE #5 to 8 in a case in which a resource element region is divided every four CCEs, and CCE #1 to 8 in a case in which a resource element region is divided every eight CCEs. Accordingly, it is possible to reduce the number of CCEs unavailable for an LTE mobile station, as compared to a case in which an LTE+ mobile station selects CCE #3, 5 in a case in which a resource element region is divided every two CCEs+ with allocation example C.

Here, allocation example D may be an allocation example in which a region composed of four CCEs is a basic resource element region. That is, with allocation example D, CCEs+ are allocated based on this basic resource element region composed of four CCEs.

To be more specific, like a case in which a resource element region is divided per CCE+, a plurality of PDCCHs+ each corresponding to one CCE+ are assigned to a basic resource element region, a plurality of CCEs are assigned to a basic resource element region. In allocation example D shown in FIG. 9, three CCEs+ #1, #2 and #3 in a case in which a resource element region is divided per CCE+, are assigned to a basic resource element region (CCE #1 to CCE #4).

Like in a case in which a resource element region is divided every two CCEs+, when it is possible to allocate only one PDCCH+ corresponding to two CCEs+, to a basic resource element region, one PDCCH+ corresponding to two CCEs+ is allocated, and then the beginning position of a region obtained by multiplying a basic resource element region by an integer is the beginning position of a region in which a PDCCH+ corresponding to the next two CCEs+ is allocated.

In allocation example D shown in FIG. 9, CCE+ #1, 2 in a case in which a resource element region is divided every two CCEs+, are allocated to a basic resource element region (CCE #1 to CCE #4). Then, the end position of the basic resource element region is the beginning position of the next two CCEs+ of CCE+#5, 6.

Like in a case in which a resource element region is divided every four CCEs or eight CCEs, when it is possible to allocate no PDCCH+ corresponding to four CCEs+ or eight CCEs+, a PDCCH+ corresponding to four CCEs+ or eight CCEs+ are allocated over a basic resource element region. When a basic resource element includes only one region composed of four CCEs+ or eight CCEs+, each beginning position in a case in which a resource element region is divided every four CCEs+ or eight CCEs+ is the end position of a region twice as large as a basic resource element region. When the number of basic resource element regions included in a region composed of four CCEs+ or eight CCEs+, is equal to or more than two and less than four, each beginning position in a case in which a resource element region is divided every four CCEs+ or eight CCEs+, is the end position of an region four times a basic resource element region.

The CCE+ numbers assignment method has been explained where an LTE+ CCE+ is composed of forty-eight REs, and four CCEs correspond to three CCEs+. Here, the configuration of a base station that assigns PDCCHs or PDCCHs+ to CCEs or CCEs+, using CCE+ numbers assigned as described above, is the same as in Embodiment 1, and also the configuration of a mobile station that receives signals transmitted from the base station is the same as in Embodiment 1.

Embodiment 3

With Embodiment 2, a case has been explained where a CCEs+ is composed of forty-eight REs, and the number of CCEs+ is 1, 2, 4 and 8. With the present embodiment, a CCE+ is composed of forty-eight REs and the number of CCEs+ is 1, 3 and 6.

Allocation Example E

Figure 10:
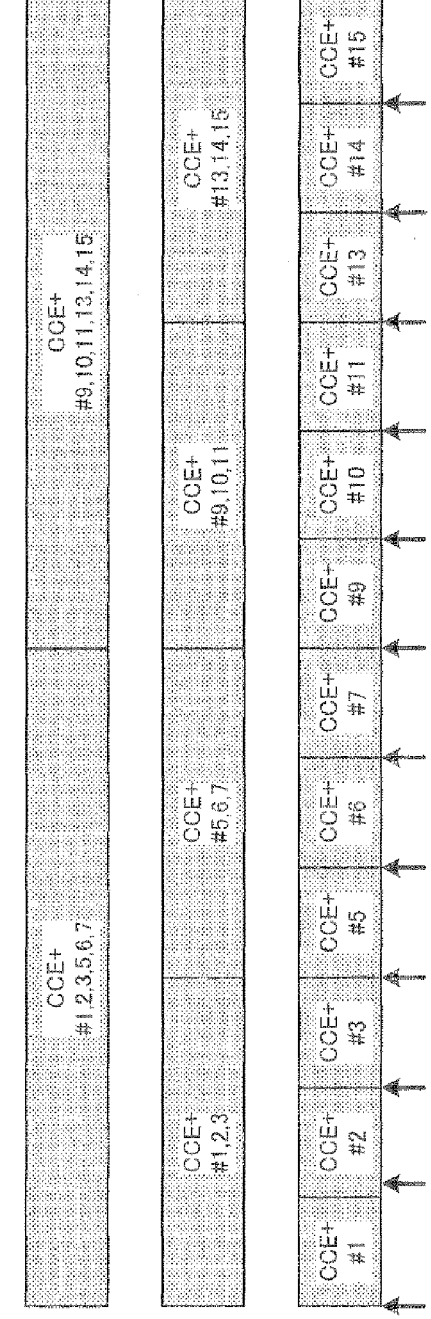
FIG. 10 shows an example of allocation of CCEs and CCEs+ according to Embodiment 3 of the present invention.

FIG. 10 shows allocation example E according to the present embodiment. With allocation example E, when a CCE+ is composed of forty-eight REs, that is, four CCEs correspond to three CCEs+, the number of CCEs+ is 1, 3 and 6. By this means, it is possible to match the beginning positions in a case in which a resource element region is divided every three CCEs+ with the beginning positions in a case in which a resource element region is divided every four CCEs. In addition, it is possible to match the beginning positions in a case in which a resource element region is divided every six CCEs+ with the beginning positions in a case in which a resource element region is divided every eight CCEs.

In this way, when four CCEs correspond to three CCEs+, the number of CCEs+ is 1, 3 and 6, so that it is possible to match the beginning positions in a case in which a resource element region is divided every 3×q CCEs+ with the beginning positions in a case in which a resource element region is divided every 4×q CCEs (here, q is a natural number). As a result of this, when a certain CCE+ is selected, it is possible to reduce cases in which a plurality of CCEs are unavailable.

For example, when an LTE+ mobile station selects CCEs+ #5, 6, 7 in which a resource element region is divided every three CCEs+, an LTE mobile station can select CCE #1 to 4 and also CCE #9 to 12 in a case in which a resource element region is divided every four CCEs.

That is, a resource element region composed of N CCEs is divided into M CCEs+, and, when N CCEs correspond to M CCEs+, the number of CCEs+ is K=1, M×L. Here, L represents the number of CCEs, where, with LTE, $L=2^{q-1}$ (q is a natural number). When the number of CCEs+ is K=1, M×L, it is possible to match the beginning positions in a case in which a resource element region is divided every M×q CCEs+ with the beginning positions in a case in which a resource element region is divided every N×q CCEs (M and N are natural numbers).

As described above, it is anticipated that the amount of control information that should be transmitted with LTE+ is greater than with LTE, due to increase in the number of antennas and assigned bands. Therefore, the size of a CCE+ needs to be greater than the size of a CCE. Here, when N is a natural number and N>M, it is possible to assure a size greater than the size of a CCE as the size of a CCE+. In addition, a size smaller than twice the size of a CCE may be enough for a required size of a CCE+, so that M and N may be set to satisfy N/M<2. By this means, it is possible to efficiently assign LTE+ control information, to resources.

In this way, when M (M is a natural number) multiples of a resource element region consisting of one CCE+ is equal to N multiples of a resource element region consisting of one CCE, the number K of CCEs+ is 1, M×L. For example, if N=4 and M=3, the number K of CCEs+ is 1, 3 and 6 . . . , and, this is equivalent to allocation example E.

Here, with allocation example E, N is equivalent to any of the number L of CCEs. To be more specific, with allocation example E, N=4 and a resource element region composed of four CCEs is assigned to M (=3) CCEs+, so that it is possible to match the beginning positions in a case in which a resource element region is divided every 3×q CCEs+ with the beginning positions in a case in which a resource element region is divided every 4×q CCEs, and allocate CCEs and CCE+ without a remainder.

As described above, with the present embodiment, M (M is a natural number) multiples of a resource element region consisting of one CCE+ is equal to N (N is a natural number, N>M and N<M<2) multiples of a resource element region consisting of one CCE, and, when N CCEs correspond to M CCEs+, the number K of CCEs+ is 1, M×L. Bt this means, it is possible to match the beginning positions in a case in which a resource element region is divided every M×q CCEs+ with the beginning positions in a case in which a resource element region is divided every N×q CCEs (q is a natural number), and therefore, when a certain CCE+ is selected, it is possible to reduce cases in which a plurality of CCEs are unavailable.

In addition, when N is equal to any of the numbers L of CCEs, it is possible to allocate CCEs and CCEs+ without a remainder.

Here, the configurations of a base station and a mobile station that assign control signals to CCEs and CCEs+ using CCE+ numbers assigned as described above, are the same as in Embodiment 1.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2008-250618, filed on Sep. 29, 2008, including the specification, drawings and abstract, is incorporated herein by reference in its entirety.

INDUSTRIAL APPLICABILITY

The CCE+ number assignment method and the base station apparatus according to the present invention are useful as a CCE+ number assignment method and a base station apparatus for an LTE+ system in a mixed system in which a LTE system and the LTE+ system exist together.

REFERENCE SIGNS LIST

100 Base station
101, 201 Radio receiving section
102, 207 demodulation and decoding section
103 ACK/NACK receiving section
104 Control section
105 CCE and CCE+ mapping section 106, 209 Modulation and coding section
107, 206 RE mapping section
108 and 210 Radio transmitting section
200 Mobile station
202 Control signal extracting section
203 CRC section
204 Control section
205 Modulation section
208 Error detecting section

The invention claimed is:

1. A method for transmitting a control information on a control channel element (CCE), the method comprising:
mapping a first downlink control information in a first communication system to at least one of CCEs+, wherein each of the CCEs+ is comprised of resource elements and the CCEs+ are numbered respectively by CCE+ numbers that are assigned thereto; and
transmitting the first downlink control information on said at least one of the CCEs+ that are numbered by the CCE+ numbers,
wherein the CCE+ numbers are respectively assigned to the CCEs+ such that each of the CCEs+ has a CCE+ number same as a CCE number that is assigned to a CCE, that is used for a second downlink control information in a second communication system and that is comprised of the resource elements, of which said each of the CCEs+ is comprised, and
a beginning position of at least one of the CCEs+ is matched with a position obtained by multiplying an L number of CCE(s) by an integer, wherein the L is one of aggregation sizes of CCEs, which is used for the second downlink control information.

2. The method according to claim 1, wherein M times of the CCE+ is equal to N times of CCE, where M is a natural number, N is a natural number, N>M and N/M<2.

3. The method according to claim 2, further comprising, when an aggregation size of CCEs+ to which the first downlink control information is mapped is 1, matching a beginning position of an M number of consecutive CCEs+ with a position of a CCE having a CCE number satisfying a function of the CCF number mod N=1.

4. The method according to claim 2, further comprising, when an aggregation size of CCEs+ to which the first downlink control information is mapped is $K=2^k$, matching a beginning position of a K number of consecutive CCEs+ with a position of CCE having a CCE number satisfying a function of the CCE number mod(N·K/2)=1, where k is a natural number.

5. The method according to claim 2, further comprising, when an aggregation size of CCEs which is used for the second downlink control information is $L=2^{p-1}$ and an aggregation size of CCEs+ to which the first downlink control information is mapped is 1, matching a beginning of an M number of consecutive CCEs+ with a position of a CCE having a CCE number satisfying a function of the CCE number mod 4=1, where p is a natural number.

6. The method according to claim 2, further comprising, when an aggregation size of CCEs which is used for the second downlink control information is mapped is $L=2^{p-1}$ and an aggregation size of CCEs+ to which the first downlink control information is mapped is $K=2^k$, matching a beginning position of a K number of consecutive CCEs+ with a position of a CCE having a CCE number satisfying a function of the CCE number mod(2×K)=1, where p is a natural number and k is a natural number.

7. The method according to claim 2, further comprising, when an aggregation size of CCEs+ to which the first downlink control information is mapped is $K=2^k$, matching a beginning position of a K×M number of consecutive CCEs+ with a position of a CCE having a CCE number satisfying a function of the CCE number mod(4×K)−1, where k is a natural number.

8. The method according to claim 2, wherein an aggregation size of CCEs which is used for the second downlink control information is $L=2^{q-1}$ and an aggregation size of CCEs+ to which the first control channel is mapped is K==1, M×L, where q is a natural number.

9. The method according to claim 2, wherein N=3 and M=2.

10. The method according to claim 2, wherein N=4 and M=3.

11. The method according to claim 1, wherein the first communication system is a Long-Term-Evolution-Advanced (LTE+) system, and the second communication system is a LTE.

12. The method according to claim 1, further comprising:
receiving an ACK/NACK signal, which is transmitted from a mobile station on a uplink control channel, wherein the uplink control channel is associated with said at least one of CCEs+ to which the first downlink control information is mapped.

13. The method according to claim 1, wherein a size of the first downlink control information is greater than a size of the second downlink control information.

14. A base station apparatus transmitting a control information on a control channel element (CCE), the base station apparatus comprising:
a mapping section configured to map a first downlink control information in a first communication system to at least one of CCEs+, wherein each of the CCEs+ is comprised of resource elements and the CCEs+ are numbered respectively by the CCE+ numbers that are assigned thereto; and
a transmitting section configured to transmit the first downlink control information on said at least one of the CCEs+ that are numbered by the CCE+ numbers,
wherein the CCE+ numbers are respectively assigned to the CCEs+ such that each of the CCEs+ has a CCE+ number same as a CCE number that is assigned to a CCE, that is used for a second downlink control information in a second communication system and that is comprised of the resource elements, of which said each of the CCEs+ is comprised, and
a beginning position of at least one of the CCEs+ is matched with a position obtained by multiplying an L number of CCE(s) by an integer, wherein the L is one of aggregation sizes of CCEs, which is used for the second downlink control information.

15. The base station apparatus according to claim 14, wherein the first communication system is a Long-Term-Evolution-Advanced (LTE+) system, and the second communication system is a LTE.

16. The base station apparatus according to claim 14, further comprising:
a receiving section configured to receive an ACK/NACK signal, which is transmitted from a mobile station on an uplink control channel, wherein the uplink control channel is associated with said at least one of CCEs+ to which the first downlink control information is mapped.

17. The base station apparatus according to claim 14, wherein a size of the first downlink control information is greater than a size of the second downlink control information.

* * * * *